United States Patent [19]

Habermann

[11] Patent Number: 5,086,208
[45] Date of Patent: Feb. 4, 1992

[54] HAND HELD ELECTRIC ARC WELDER

[75] Inventor: Joseph P. Habermann, Hartland, Wis.

[73] Assignee: Hein-Werner Corporation, Waukesha, Wis.

[21] Appl. No.: 608,199

[22] Filed: Nov. 2, 1990

[51] Int. Cl.⁵ ............................................. B23K 9/133
[52] U.S. Cl. ............................. 219/130.1; 219/137.71
[58] Field of Search ............ 219/130.1, 137.71, 137.2, 219/125.1

[56] References Cited

U.S. PATENT DOCUMENTS

| 4,119,830 | 10/1978 | Gilliland | 219/137.71 |
| 4,590,357 | 5/1986 | Winkler | 219/130.1 |
| 4,801,780 | 1/1989 | Hayes | 219/130.1 |

FOREIGN PATENT DOCUMENTS 2650522 5/1978 Fed. Rep. of Germany ... 219/125.1

OTHER PUBLICATIONS

Instructions for L-TEC 225 MIGMASTER, F-1-2-869-E Feb., 1987.
Marquette Operating, Instructions and Parts List, Gas/No No Gas Mix Welder Model 12183, Aug. 1989.
Miller Spoolmate 200 Brochure, Index No. DC/12.4, Jul. 1982.
Prince Spool Gun Advertisement, *Welding Design & Fabrication,* May, 1990.
Miller Spoolmatic Feeder/Guns and WC Controls Brochure, Index No. M/1.0, Apr. 1980.
Lincoln Electric Magnum SG Spol Gun Brochure, E892, Jun. 1988.
Instructions for L-TEC ST-23A Spool-On-Gun Mig Welding Torch, F-14-353-A, Dec. 1986.
Profax Aug. 1988 Catalog, p. 3.

*Primary Examiner*—Clifford C. Shaw
*Attorney, Agent, or Firm*—Michael, Best & Friedrich

[57] ABSTRACT

An electric arc welder for performing welding on a work object, the electric arc welder comprsing a welding tip, a first connector for electrically connecting the welding tip to a first terminal of a battery, and a second connector for electrically connecting the work object to a second terminal of the battery, the second terminal being of opposite polarity from the first terminal.

14 Claims, 4 Drawing Sheets

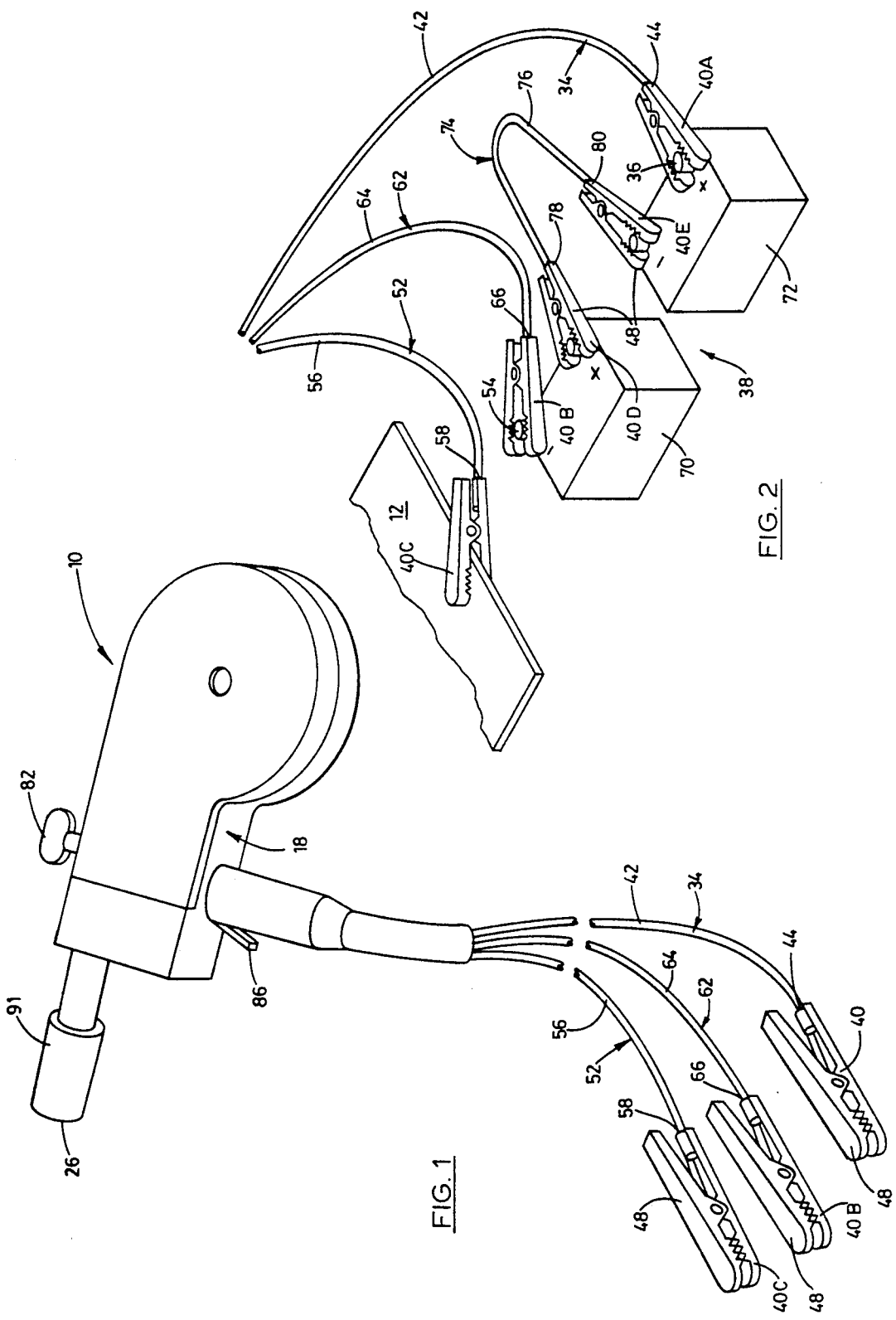

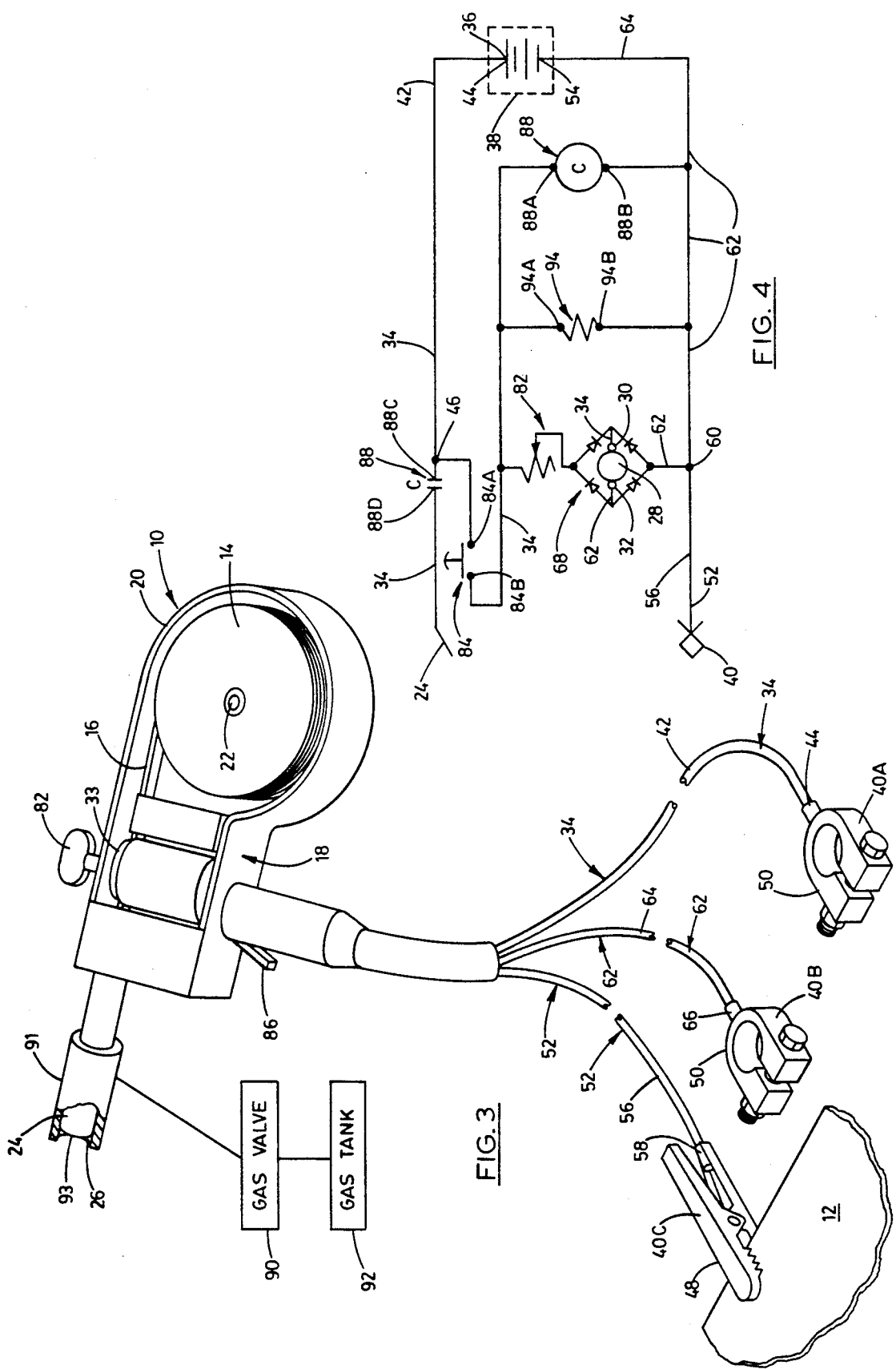

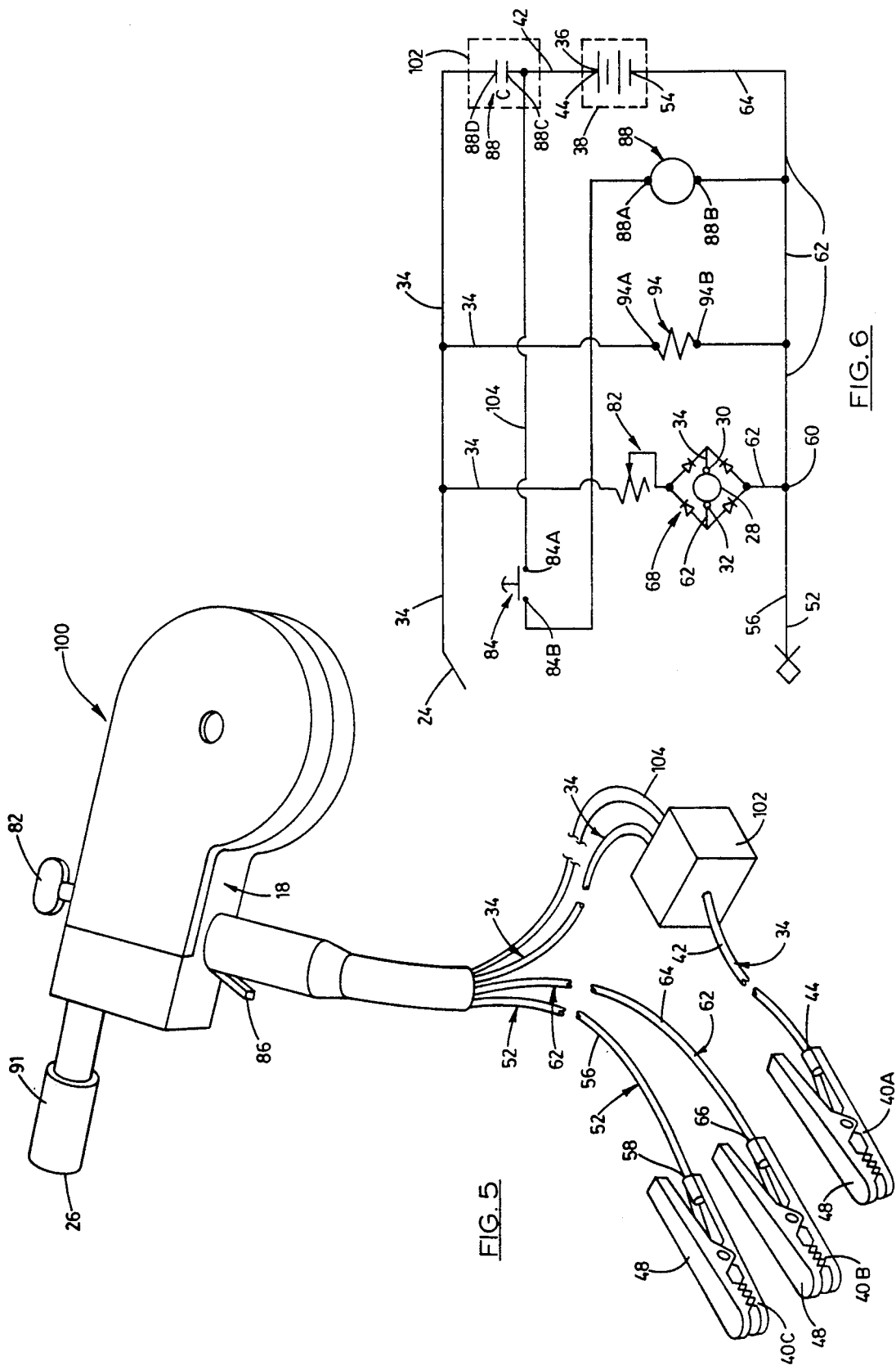

HAND HELD ELECTRIC ARC WELDER

FIELD OF THE INVENTION

The invention relates generally to welding apparatus. More particularly, the invention relates to hand held electric arc welding apparatus.

BACKGROUND OF THE INVENTION

Hand held welders have included a hand gun style unit containing a trigger and welding tip. Some of these welders also include a welding wire feed apparatus and a welding wire feed speed control supported by the hand held unit. While these welders can provide increased mobility over traditional arc welders, they nevertheless require an alternating current ("A.C.") power supply unit or are engine driven welders. This requirement decreases the portability and on-site mobility of the welder because the power unit is bulky and heavy. Furthermore, such welding units require electric power (usually 200/230 V, 60 Hz) supplied by an A.C. line connection. Such a connection further decreases the portability and mobility of the welder because of the necessity of having a line connection nearby.

Other welders have included torches connected to a container having a wire spool for feeding welding wire and wire drive means, these welders being connected to a 24 volt battery external of the container and for supplying electrical power to the welder and to the wire spool drive means.

SUMMARY OF THE INVENTION

The invention provides an electric arc welder for performing welding on a work object. The electric arc welder includes a welding tip, a first connector for electrically connecting the welding tip to a first terminal of a battery, and a second connector for electrically connecting the work object to a second terminal of the battery, the second terminal being of opposite polarity from the first terminal.

In one aspect of the invention, the welder includes a hand holdable body including structure for supporting a spool of welding wire, and the welding tip is supported by the hand holdable body and includes an aperture through which the welding wire is fed. The welder further includes a drive apparatus for feeding welding wire through the aperture in the welding tip. Also, in one aspect of the invention, the first connector electrically connects the welding tip and the drive apparatus to the first terminal of the battery, and the second connector electrically connects the drive apparatus to the second terminal of the battery.

In one aspect of the invention, the first connector includes a releasable clamp and a cable having one end electrically connected to the releasable clamp and having an opposite end electrically connected to the welding tip.

In one aspect of the invention, the second connector includes a second releasable clamp and a second cable having one end electrically connected to the second releasable clamp and having an opposite end adapted to be connected to the second terminal of the battery.

In one aspect of the invention, the welder further includes a battery having first and second terminals of opposite polarities, the first connector being electrically connected to the first battery terminal and the second connector being electrically connected to the second battery terminal.

In one aspect of the invention, the battery includes a first 12 volt dc car battery, a second 12 volt dc car battery, and a connector for electrically serially connecting the first and second 12 volt dc batteries.

In one aspect of the invention, the connector for serially connecting the first and second 12 volt dc batteries includes an electrically conductive battery connecting cable having opposite ends, and a releasable clamp electrically connected to each of the opposite ends of the battery connecting cable.

These and other features and advantages of the invention will become apparent to those of ordinary skill in the art upon review of the following Detailed Description of the Preferred Embodiment of the Invention, reference being made to the appended drawings.

BRIEF DESCRIPTION OF THE VIEWS OF THE DRAWINGS

FIG. 1 is a perspective view of a welder in accordance with the present invention.

FIG. 2 is a broken away perspective view showing connectors and batteries of the welder of FIG. 1 and illustrating a circuit arrangement appropriate for welding with the welder of FIG. 1.

FIG. 3 is a perspective view of the welder of FIG. 1 with a cover of the body of the welder removed, and illustrating alternative connectors and diagrammatically illustrating an optional gas tank and gas valve.

FIG. 4 is a circuit schematic illustrating the circuit defined by the welder of FIG. 1 when the welder includes a battery as shown in FIG. 2.

FIG. 5 is a perspective view of a welder in accordance with an alternative embodiment of the invention.

FIG. 6 is a circuit schematic illustrating the circuit defined by the welder of FIG. 5 when the welder of FIG. 5 includes a battery.

DETAILED DESCRIPTION OF THE PREFERRED EMBODIMENT OF THE INVENTION

Figure 8:
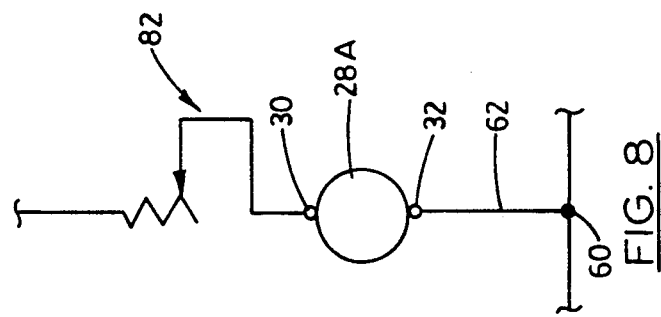
FIG. 8 is a broken away portion of a circuit schematic showing another alternative motor configuration for the welder of FIG. 1 or the welder of FIG. 5.

It is to be understood that when a first component is described herein as being electrically connected to a second component, this does not preclude the introduction of one or more components between the first component and the second component.

Shown in the various figures is an electric arc welder 10 for performing welding on a work object 12 and adapted to be used with a spool 14 of welding wire 16.

The electric arc welder 10 comprises a hand holdable body 18. The body 18 optionally but preferably includes means for supporting the spool 14 of welding wire. In the preferred embodiment of the invention, the spool supporting means comprises a spool supporting area 20 and a spindle 22 defined by the body 18. The spool 14 is preferably freely rotatable about the spindle 22 and the welding wire 16 is driven by a motor, as will be described below. The spool supporting area 20 could optionally be defined by clear plastic to allow the user of the welder to judge how much wire 16 is left on the spool 14. The spool supporting area 20 can be integral with the rest of the body 18, as shown, or can be a cylinder spaced from but supported by the rest of the body 18.

The welder 10 further includes a welding tip 24 supported by the hand holdable body 18 and including an aperture 26 adapted to have welding wire 16 fed therethrough.

The welder 10 further includes drive means for feeding welding wire 16 through the aperture 26 in the welding tip 24. In the preferred embodiment of the invention, the drive means comprises a dc motor 28 (see FIG. 3) having a first terminal 30 and a second terminal 32 (see FIG. 4). Preferably, the drive means includes a gear reduction box (not shown), and a wire gripping wheel mechanism 33. Preferably, the motor 28 is a 24 volt dc motor. Optionally, but preferably, the motor 28 is a variable speed motor.

The welder 10 further includes connecting means 34 for electrically connecting the welding tip 24 and the first terminal 30 of the motor 28 to a first terminal 36 of a battery 38. It is to be understood that not all locations along the connecting means 34 are necessarily at the same electrical potential—for example, although the connecting means 34 connects the welding tip 24 and the terminal 30 of the motor 28 to the first terminal 36 of the battery 38, the welding tip 24 and the terminal 30 are not necessarily at the same electrical potential. In the preferred embodiment of the invention, the connecting means 34 comprises a releasable clamp 40A and electrically conductive means, including cable 42, having a first end 44 electrically connected to the releasable clamp 40A and having a second end 46 electrically connected to the welding tip 24 and to the first terminal 30 of the motor 28. The connecting means 34 may include additional electrically conductive means; for example, the connecting means 34 may include circuit components, circuit traces on a printed circuit board, and/or additional cables. In the preferred embodiment, the releasable clamp 40A is an alligator clip 48 of the kind shown in FIG. 2 and normally associated with car battery jumper cables. Optionally, the releasable clamp 40A is a nut and bolt type clamp 50 of the type shown in FIG. 3 and normally associated with cables connecting a car's electrical system to battery posts of a car battery. Other types of releasable clamps can also be used.

The welder 10 further includes connecting means 62 for electrically connecting the second terminal 32 of the motor 28 to a second terminal 54 of the battery 38, the second terminal 54 being of opposite polarity from the first terminal 36. In the preferred embodiment of the invention, the connecting means 62 comprises a releasable clamp 40B and electrically conductive means, including cable 64, having a first end 66 electrically connected to the releasable clamp 40B and having a second end 60 electrically connected to the second terminal 32 of the motor. In the preferred embodiment, the releasable clamp 40B of the connecting means 62 is an alligator clip 48 of the kind shown in FIG. 2 and of the type employed in car battery jumper cables. Optionally, the releasable clamp 40B of the connecting means 62 is a nut and bolt type clamp 50 of the type shown in FIG. 3 and normally used with cables connecting a car's electrical system to battery posts of a car battery. Other types of releasable clamps can also be used.

The welder 10 further includes connecting means 52 for electrically connecting the work object 12 to the second terminal 54 of the battery 38. In the preferred embodiment of the invention, the connecting means 52 comprises a releasable clamp 40C and electrically conductive means, including cable 56, having a first end 58 electrically connected to the releasable clamp 40C and having a second end 60 electrically connected to the second terminal 54 of the battery 38. Although the second end 60 of the connecting means 52 could be connected directly to the second terminal 54 of the battery 38, in the illustrated embodiment, the connecting means 52 includes at least a portion of the connecting means 62, and the second end 60 is electrically connected to the second terminal 54 of the battery 38 via at least a portion of the connecting means 62. In the preferred embodiment, the releasable clamp 40 of the connecting means 52 is an alligator clip 48 of the kind shown in FIG. 2 and normally associated with car battery jumper cables.

Not all locations along either of the connecting means 52 and 62 are necessarily at the same electrical potential, and, like the connecting means 34, the connecting means 52 and 62 may include additional electrically conductive means.

The welder 10 further includes means for causing the motor 28 to operate in a direction for feeding welding wire 16 to the welding tip 24 when the first terminal 36 of the battery has a positive polarity and for causing the motor 28 to operate in a direction for feeding welding wire 16 to the welding tip 24 when the first terminal 36 of the battery has a negative polarity. In other words, the welder 10 includes means for causing the motor 28 to operate in a direction for feeding welding wire 16 to the welding tip 24 regardless of whether the connecting means 34 and 62 are connected to the positive and the negative terminals of the battery 38, respectively, or to the negative and the positive terminals of the battery 38, respectively. In the preferred embodiment, the means for causing the motor 28 to operate in the direction for feeding comprises a diode bridge 68 (see FIG. 4) connecting the first and second terminals 30 and 32, respectively, of the motor to the connecting means 34 and 62.

Preferably, the welder 10 includes the battery 38, and the battery 38 is a 24 volt dc battery comprising a first and second 12 volt dc car battery 70 and 72, respectively, and means 74 electrically serially connecting the first and second 12 volt dc batteries 70 and 72 to define the 24 volt dc battery 38 having the first and second terminals 36 and 54 of opposite polarities. In the preferred embodiment of the invention, the means serially connecting the first and second 12 volt dc batteries 70 and 72 comprises an electrically conductive battery connecting cable 76 having opposite ends 78 and 80, and releasable clamps 40D and 40E electrically connected to the opposite ends 78 and 80 of the battery connecting cable 76, respectively. Optionally, the battery 38 could comprise four 6 volt dc batteries (not shown), and means electrically serially connecting the four 6 volt dc batteries to define the 24 volt dc battery 38, wherein the means serially connecting the four 6 volt dc batteries comprises three battery connecting cables 76.

It is to be understood that, in use, the actual voltage of a "12 volt" car battery varies from 12 volts, depending upon the state of charge or discharge of the battery, and can be greater than or less than 12 volts.

The welder 10 further includes means for controlling the speed of the motor 28, the speed controlling means being connected in series with the motor 28, and the series connected motor and speed controlling means being connected between the connecting means 34 and the connecting means 62. The speed controlling means controls the speed of the motor 28 by selectively reducing the voltage between the connecting means 34 and the connecting means 62 and supplying the reduced voltage across the first and second terminals 30 and 32 of the motor 28. In the preferred embodiment, the speed controlling means comprises a variable resistor 82 supported by the body 18 and electrically connected between one of said first and second terminals 30 and 32 of the motor 28 and a corresponding one of the connecting means 34 and 62.

The welder 10 further includes a switch 84 mechanically connected to a trigger 86 that is supported by the body 18. The switch 84 is serially electrically connected between the battery 38 and the motor 28. Preferably, the switch 84 has a first terminal 84A electrically connected to the first terminal 36 of the battery, and a second terminal 84B electrically connected to the motor 28. More particularly, in the preferred embodiment the second terminal 84B is electrically connected to the motor 28 via the variable resistor 92. The switch 84 is arranged such that when an operator of the welder 10 squeezes the trigger 86, the motor 28 is electrically connected to the battery 38, and so that when the operator of the welder 10 releases the trigger 86, the motor 28 is disconnected from the battery 38.

Optionally, when the trigger 86 is squeezed, the switch 84 will connect the welding tip 24 to the first terminal 36 of the battery 38 as well as connecting the motor 28 to the battery 38. In this regard, the welder 10 optionally further includes a contactor switch 88, having a terminal 88A electrically connected to the terminal 84B of the switch 84, having a terminal 88B electrically connected to the second terminal 54 of the battery, having a first contact 88C connected to the first terminal 36 of the battery 38, and having a second contact 88D connected to the welding tip 24, the contactor 88 controlling the supply of power from the battery 38 to the welding tip 24.

The welder 10 optionally further includes means for directing shielding gas to a location proximate the welding tip 24, and the welder 10 further includes a gas valve 90 in fluid communication with the directing means. In the preferred embodiment of the invention, the directing means comprises a gas nozzle 91 surrounding the welding tip 24 and shaped to direct shielding gas to a location 93 for welding with gas. The gas nozzle 91 of the preferred embodiment is electrically isolated from the welding tip 24, and performs the additional function of preventing the welding tip 24 from touching the work object 12; thus, the gas nozzle 91 is preferably included regardless of whether or not the welder 10 is used to weld with shielding gas. The gas valve 90 selectively fluidly connects the gas nozzle 91 to a tank 92 of shielding gas for welding with gas. In this regard, the welder 10 would include a solenoid 94 having a first terminal 94A electrically connected to the terminal 84B of the switch 84 and having a second terminal 94B electrically connected to the connecting means 62, the solenoid 94 causing the gas valve 82 to open when the trigger 86 is squeezed and for causing the gas valve 82 to close when the trigger 86 is released, if a gas valve 90 is included in the welder 10. Alternatively, instead of the welder 10 including a solenoid 94, the gas valve 90 could be mechanically connected to the trigger 86 so that the gas valve 82 opens when the trigger 86 is squeezed, and so that the gas valve 82 closes when the trigger 86 is released.

Shown in FIGS. 5 and 6 is an alternative embodiment of the invention which is similar to the embodiments shown in FIGS. 1-4, like reference numerals indicating like components, except that the welder 100 shown in FIGS. 5 and 6 includes a box 102 containing the portion of the contactor 88 that comprises the contacts 88C and 88D. A cable 104 connects the terminal 84A of the trigger switch 84 to the cable 42 inside the box 102. The terminal 88A of the contactor is connected to the terminal 84B of the switch 84, and the terminal 88B of the contactor is connected to the second connecting means 62. The terminal 88C of the contactor 88 is selectively connected to the terminal 36 of the battery, and the terminal 88D of the contactor 88 is connected to the welding tip 24, to the variable resistor 82, and to the gas solenoid 84. When the trigger 86 is squeezed, the switch 84 electrically connects the contact 84A to the contact 84B, and current flows through the contacts 88A and 88B thereby causing the contacts 88C and 88D to close. Although FIG. 5 shows the releasable clamps 40A, and 40B as alligator clips, either of these releasable clamps could be another type of releasable clamp, such as a nut and bolt clamp 50 of the type shown in FIG. 3.

Figure 7:
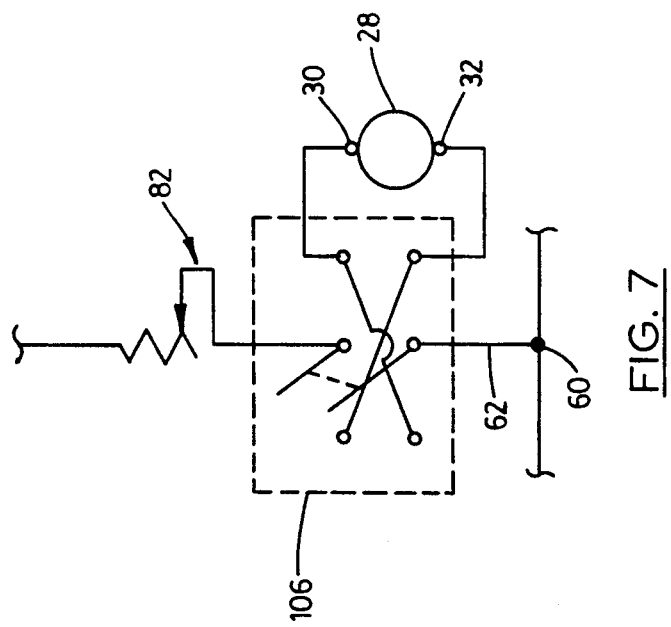
FIG. 7 is a broken away portion of a circuit schematic showing an alternative motor configuration for the welder of FIG. 1 or the welder of FIG. 5.

Shown in FIG. 7 is an alternative motor configuration for the welder of FIG. 1 or the welder of FIG. 5. In the circuit of FIG. 7, the diode bridge 68 is replaced by a double-pole, double throw switch 106 arranged in an X-fashion so that the direction of rotation of the motor 28 is reversed when the switch 106 is thrown. With the motor configuration of FIG. 7, the motor 28 can be caused to operate in the direction for feeding welding wire 16 to the welding tip 24 regardless of whether the connecting means 34 and 62 are connected to the positive and the negative terminals of the battery 38, respectively, or to the negative and the positive terminals of the battery 38. However, with the motor configuration of FIG. 7, the operator of the welder will have to determine whether or not the switch 106 should be thrown to cause the motor 28 to operate in the direction for feeding welding wire 16 to the welding tip 24.

Shown in FIG. 8 is another alternative motor configuration for the welder of FIG. 1 or the welder of FIG. 5. In the circuit of FIG. 8, the diode bridge 68 is omitted, and the motor 28 is replaced with a motor 28A. The motor 28A is a universal motor, i.e. a motor wherein the direction of rotation is the same regardless of whether the terminals 30 and 32 thereof are connected to a positive battery terminal and a negative battery terminal, respectively, or to a negative battery terminal and a positive battery terminal, respectively.

While a preferred embodiment of the invention has been disclosed, various obvious modifications will become apparent to one of ordinary skill in the art. Thus, the scope of the invention should only be limited by the spirit and scope of the appended claims.

1. An electric arc welder for performing welding on a work object, and adapted to be used with a spool of welding wire, said electric arc welder comprising:
   a hand holdable body including means for supporting the spool of welding wire;
   a welding tip supported by said hand holdable body and including an aperture adapted to have welding wire fed therethrough;
   drive means for feeding welding wire through said hand holdable body;
   a selectively squeezable trigger supported yb said hand holdable body;

a switch mechanically connected to said trigger, said switch being normally in an open position, and being in a closed position when said trigger is squeezed;

first connecting means for electrically connecting said welding tip to a first terminal of a battery only when said switch is in the closed position, and for electrically connecting said drive means to the first terminal of the battery; and second connecting means for electrically connecting said drive means to a second terminal of the battery, the second terminal of the battery being of opposite polarity from the first terminal of the battery.

2. An electric arc welder as set forth in claim 1 and further comprising means for connecting the work object to the second terminal of the battery.

3. An electric arc welder as set forth in claim 1 wherein said drive means comprises a motor having first and second terminals, one of said motor terminals being connected to said first connecting means, the other of said motor terminals being connected to said second connecting means.

4. An electric arc welder as set forth in claim 3 and further comprising means for causing said motor to operate in a direction for feeding welding wire to said welding tip when said first and second connecting means are connected to the first and second terminals of the battery, respectively, and when said first and second connecting means are connected to the second and first terminals of the battery, respectively.

5. An electric arc welder as set forth in claim 3 and further comprising a battery having first and second terminals of opposite polarities, said first connecting means being electrically connected to said first battery terminal and said second connecting means being electrically connected to said second battery terminal.

6. An electric arc welder as set forth in claim 5 wherein said motor is a 24 volt dc motor, and wherein said battery comprises a first 12 volt dc car battery, a second 12 volt dc car battery, and means for electrically serially connecting said first and second 12 volt dc batteries.

7. An electric arc welder as set forth in claim 3 and further comprising means for controlling the speed of said motor, said speed controlling means being electrically connected in series with said motor, said series connected motor and speed controlling means being connected between said first and said second connecting means, said speed controlling means controlling the speed of said motor by selectively reducing the voltage between said first and said second connecting means and supplying the reduced voltage across said first and second terminals of said motor.

8. An electric arc welder as set forth in claim 7 wherein said speed controlling means comprises a variable resistor, separate from said switch connected to said trigger, supported by said body, and electrically connected between one of said first and second terminals of said motor and a corresponding one of said first and second connecting means.

9. An electric arc welder as set forth in claim 1 and further comprising a gas valve in fluid communication with said welding tip.

10. An electric arc welder for performing welding on a work object, and adapted to be used with a spool of welding wire, said electric arc welder comprising:

a hand holdable body including means for supporting the spool of welding wire;

a welding tip supported by said hand holdable body and including an aperture adapted to have welding wire fed therethrough;

drive means for feeding welding wire through said aperture in said welding tip;

first connecting means for electrically connecting said welding tip and said drive means to a first terminal of a battery; and second connecting means for electrically connecting said drive means to a second terminal of the battery, the second terminal of the battery being of opposite polarity from the first terminal of the battery, the drive means comprising a motor having first and second terminals, one of the said motor terminals being connected to said first connecting means, the other of said motor terminals being connected to said second connecting means, said welder further comprising means for causing said motor to operate in a direction for feeding welding wire to said welding tip when said first and second connecting means are connected to the first and second terminals of the battery, respectively, and when said first and second connecting means are connected to the second and first terminals of the battery, respectively, said means for causing said motor to operate in a direction for feeding comprising a diode bridge connecting said first connecting means and said second connecting means.

11. An electric arc welder for performing welding on a work object, and adapted to be used with a spool of welding wire, said electric arc welder comprising:

a hand holdable body including means for supporting the spool of welding wire;

a welding tip supported by said hand holdable body and including an aperture adapted to have welding wire fed therethrough;

drive means for feeding welding wire through said aperture in said welding tip, said drive means comprising a 24 volt dc motor having first and second terminals;

a 24 volt dc battery comprising a first and second 12 volt dc car battery, and means electrically serially connecting said first and second 12 volt dc batteries, said 24 volt dc battery having first and second terminals of opposite polarities;

first motor to battery connecting means electrically connecting said welding tip and said first terminal of said motor to said first terminal of said 24 volt dc battery;

second motor to battery connecting means electrically connecting said second terminal of said motor to said second terminal of said 24 volt dc battery;

means for connecting the work object to said second terminal of said 24 volt dc battery;

means for causing said motor to operate in a direction for feeding welding wire to said welding tip when said first terminal of said 24 volt dc battery has a positive polarity and for causing said motor to operate in a direction for feeding welding wire to said welding tip when said first terminal of said 24 volt dc battery has a negative polarity, said means for causing said motor to operate in a direction for feeding comprising a diode bridge connecting said first and second terminals of said motor to said first and said second motor to battery connecting means;

means for directing shielding gas to a location proximate said welding tip;
a gas valve in fluid communication with said directing means; and
means electrically connected between said first and said second motor to battery connecting means and for controlling the speed of said motor by selectively reducing the voltage between said first and said second motor to battery connecting means and supplying the reduced voltage across said first and second terminals of said motor, said speed controlling means comprising a variable resistor supported by said body and electrically connected between one of said first and second terminals of said motor and a corresponding one of said first and second motor to battery connecting means.

12. An electric arc welder as set forth in claim 11 wherein said first motor to battery connecting means comprises a releasable clamp releasably connected to said first terminal of said 24 volt dc battery.

13. An electric arc welder as set forth in claim 12 wherein said second motor to battery connecting means comprises a second releasable clamp releasably connected to said second terminal of said 24 volt dc battery.

14. An electric arc welder as set forth in claim 13 wherein said means serially connecting said first and second 12 volt dc batteries comprises an electrically conductive battery connecting cable having opposite ends, and a releasable clamp electrically connected to each of the opposite ends of said battery connecting cable.

* * * * *